US010967345B2

(12) United States Patent
Girón Muñoz et al.

(10) Patent No.: US 10,967,345 B2
(45) Date of Patent: Apr. 6, 2021

(54) MULTIPLE MODULAR SYSTEM FOR THE FORMATION OF PARTICLES IN POWDER AND MICROCAPSULE FORM FOR DIFFERENT PROCESSES

(71) Applicant: PREMEX S.A.S., Antioquia (CO)

(72) Inventors: Edicson Girón Muñoz, Antioquia (CO); Oscar Alejandro Vanegas Monterrosa, Antioquia (CO); Alejandro Mesa Gomez, Antioquia (CO)

(73) Assignee: PREMEX S.A.S., Antioquia (CO)

( * ) Notice: Subject to any disclaimer, the term of this patent is extended or adjusted under 35 U.S.C. 154(b) by 0 days.

(21) Appl. No.: 16/840,264

(22) Filed: Apr. 3, 2020

(65) Prior Publication Data
US 2020/0298195 A1 Sep. 24, 2020

Related U.S. Application Data

(63) Continuation-in-part of application No. 15/131,668, filed on Apr. 18, 2016, now abandoned.

(51) Int. Cl.
| | | |
|---|---|---|
| *B01J 2/04* | (2006.01) | |
| *B01D 1/18* | (2006.01) | |
| *C08J 3/12* | (2006.01) | |
| *B01D 1/20* | (2006.01) | |
| *A23L 27/00* | (2016.01) | |

(52) U.S. Cl.
CPC .................. *B01J 2/04* (2013.01); *A23L 27/72* (2016.08); *B01D 1/18* (2013.01); *B01D 1/20* (2013.01); *C08J 3/122* (2013.01)

(58) Field of Classification Search
None
See application file for complete search history.

(56) References Cited

U.S. PATENT DOCUMENTS

| | | |
|---|---|---|
| 300,521 A | 6/1884 | Thom |
| 3,015,128 A | 1/1962 | Somerville, Jr. |
| 3,039,107 A | 6/1962 | Bradford |
| 3,207,824 A | 9/1965 | Wurster et al. |
| 3,329,994 A | 7/1967 | Watanabe |
| 3,702,748 A | 11/1972 | Storb et al. |
| 4,386,895 A | 6/1983 | Sodickson |
| 4,521,378 A | 6/1985 | Ichimura et al. |
| 5,096,537 A | 3/1992 | Bergquist et al. |

(Continued)

FOREIGN PATENT DOCUMENTS

| | | |
|---|---|---|
| CN | 101278688 A | 10/2008 |
| CN | 101869150 A | 10/2010 |

(Continued)

*Primary Examiner* — Jacob T Minskey
*Assistant Examiner* — Baileigh K Darnell
(74) *Attorney, Agent, or Firm* — Procopio, Cory, Hargreaves & Savitch LLP

(57) ABSTRACT

The present invention discloses a multiple modular system for the formation of powders, characterized in that it comprises a tower (1) comprising an interchangeable head A selected from the group consisting of a disk spray unit A1; a nozzle spray unit A2; a dual fluid spray unit A3 and a high temperature spray unit A4; and wherein said tower comprises an interchangeable collector installed in the lower part B of the tower (1) selected from the group consisting of collector type 1 (B1), collector type 2 (B2), collector type 3 (B3) and collector type 4 (B4) or combinations of the same.

12 Claims, 12 Drawing Sheets

(56) References Cited

U.S. PATENT DOCUMENTS

| | | | |
|---|---|---|---|
| 5,417,153 | A | 5/1995 | King et al. |
| 5,924,216 | A | 7/1999 | Takahashi |
| 6,308,434 | B1 | 10/2001 | Chickering et al. |
| 6,575,721 | B1 | 6/2003 | Daly et al. |
| 7,261,529 | B2 | 8/2007 | Persyn et al. |
| 8,252,211 | B2 | 8/2012 | Dahlheimer et al. |
| 8,533,971 | B2 | 9/2013 | Hubbard, Jr. et al. |
| 2003/0163931 | A1 | 9/2003 | Beyerinck et al. |
| 2004/0123798 | A1 | 7/2004 | Huttlin |
| 2005/0051917 | A1 | 3/2005 | Grothe et al. |
| 2009/0022965 | A1 | 1/2009 | Shinya et al. |
| 2013/0015264 | A1 | 1/2013 | Bazergui |

FOREIGN PATENT DOCUMENTS

| | | |
|---|---|---|
| CN | 102553276 A | 7/2012 |
| GB | 9808470 A | 6/1998 |

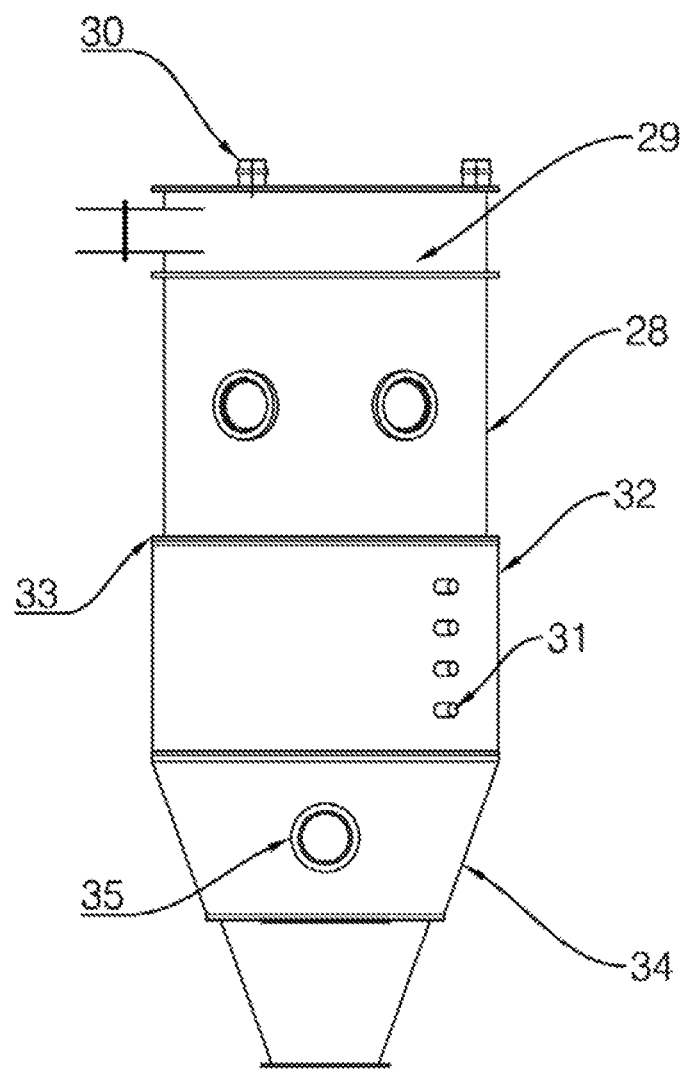
FIG. 10.1

MULTIPLE MODULAR SYSTEM FOR THE FORMATION OF PARTICLES IN POWDER AND MICROCAPSULE FORM FOR DIFFERENT PROCESSES

CROSS-REFERENCE TO RELATED APPLICATIONS

This application is a Continuation-In-Part Application of U.S. application Ser. No. 15/131,668, filed on Apr. 18, 2016, the content of which is incorporated herein by reference.

FIELD OF THE INVENTION

The present invention relates to multiple modular devices or systems for the obtainment of products in powder form having desired characteristics of particle size and configuration.

STATE OF THE ART

The formation of powders or particulate solid materials in industrial terms is important by virtue of the fact that it is a convenient and advantageous manner of presentation of, inter alia, pharmaceutical, cosmetic, veterinary and agroindustrial products. Products in powder form permit the conservation and improvement of desirable characteristics of products such as increase in the shelf life thereof, improvement in dosing, ease of storage and ease of transport thereof because, by virtue of the water content thereof, they may be susceptible to experiencing undesired chemical reactions and degradation through attack, inter alia, by microorganisms.

Apparatuses or devices for drying, encapsulation and microencapsulation of various substances were known in the state of the art wherein, according to the product in powder form to be obtained, the use of a specific apparatus, the use of several coupled units or the interchange of apparatuses to obtain the desired result is required, signifying that the processes for obtainment of powders having differing requirements of size, of composition and of disposition of active ingredients within a matrix necessitated complex infrastructure and long waiting periods between the replacement of apparatuses. For different industrial processes requiring different drying equipment, for example for independent industrial processes requiring spray cooling, fluidized bed drying or spray drying, three apparatuses were required to realize said drying stages.

In this respect, U.S. Pat. No. 300,521 is known to disclose an apparatus for obtaining detergent compositions in powder form, wherein there is disclosed an apparatus for drying solely by spraying, wherein the apparatus has multiple nozzles in the upper part and means for continuous counter current spraying, wherein the equipment has a single spraying device.

For its part, the document GB 9808470 divulges a process and an apparatus for producing finely divided powders for pharmacological substances, wherein the drying apparatus corresponds solely to an apparatus of fluidized bed type, wherein a current of compressed air is supplied to a milling chamber to obtain a finely divided material through a stage of simultaneous milling and drying.

On the other hand, the patent CN 101278688 reveals a coupling between fluidized bed drying and spray drying for a single process of drying a nutritional formula having a lactic base for children, wherein the equipment is adapted to present these two drying techniques simultaneously and one subsequent to the other to obtain the product desired. The spray and fluidized bed drying are taught as stages within that process and realized by independent apparatuses coupled to one another.

For its part, the document US 2009022965 reveals a technique of microencapsulation through interfacial polymerization, wherein an apparatus is utilized to manufacture microcapsules, wherein the apparatus has solely one drying unit of the spray drying type.

On the other hand, the document CN 101869150 divulges a process for the production of milk in powder form, wherein there is respectively realized: homogenization, sterilization, concentration, spray drying, fluidized bed drying, cooling and inspection of packaging of the product obtained. This document, as in the case of the patent CN 101278688, reveals processes of obtainment of products in powder form wherein the device is adapted for spray and fluidized bed drying by means of independent machines or apparatuses coupled in a sequential manner.

Finally, the document CN 102553276 divulges a combined drying and powder removal tower, wherein said tower comprises an adjustable valve having turbulence deflectors, a spray drying tower, a fluidized bed, a cyclone and a bag powder collector, and one compartment, and having an integrated combined structure wherein the equipment is a single system, said equipment not being useful nor versatile for the utilization of the units as independent apparatuses.

In spite of the advances achieved previously in respect of apparatuses involving combinations of drying techniques in a single system, it is clear that in the state of the art the need existed for a multiple system for the formation of microcapsules and, in general, of particulate material, wherein the equipment is produced in a modular manner permitting the interchange of heads and collectors in order to carry out different processes for obtaining different products in powder form by means of the same device. Similarly, it is evident that versatile systems or apparatuses were required to realize drying techniques involving spray drying, fluidized bed, spray cooling and other techniques, minimizing operating costs, materials costs, together with the facility of a single modular apparatus having interchangeable parts for different processes wherein the device is easily modified to be adapted between differing configurations of collector systems in the lower part thereof and by means of modification of spray systems in the upper part thereof. The different collectors and spray systems of the equipment of the invention permit a plurality of combinations in order to realize diverse processes for the obtainment of powders for different products including, inter alia but without being restricted thereto, pharmaceutical, cosmetic, agricultural, veterinary and alimentary products.

SUMMARY OF THE INVENTION

The present invention provides a tower of a multiple modular system type, for the formation of powders, comprising: a tower comprising an upper portion and a lower portion, the upper portion and lower portion being arranged to permit a flow of air within the tower from the upper portion into the lower portion; an upper portion component disposed in the upper portion, the upper portion component comprising an a first interchangeable head selected from the group consisting of a disk spray unit, a nozzle spray unit, a dual fluid spray unit and a temperature spray unit, the upper portion adapted to operate, with the first interchangeable head installed, with at least one collector of a plurality of collector types, the upper portion further adapted to be modified by replacement of the first interchangeable head with a second interchangeable head of a different type from the first interchangeable head, the second interchangeable head selected from the group consisting of a disk spray unit, a nozzle spray unit, a dual fluid spray unit and a temperature spray unit, wherein the selected upper portion being further adapted to operate, with the second interchangeable head installed, is adapted to operate with any at least one collector of said plurality of collector types; and a lower portion component disposed in the lower portion, the lower portion component comprising a first interchangeable collector selected from said plurality of collector types, wherein the lower portion being adapted to operate, with the first selected interchangeable collector is adapted to operate installed, with any at least one of a disk spray unit, a nozzle spray unit, a dual fluid spray unit, and a temperature spray unit, the lower portion adapted to be modified by replacement of the first interchangeable collector with a second interchangeable collector of a different type from the first interchangeable collector, the second interchangeable collector selected from said plurality of collector types, the lower portion being further adapted to operate, with the second interchangeable collector installed, with at least one of a disk spray unit, a nozzle spray unit, a dual fluid spray unit, and a temperature spray unit.

In a preferred embodiment, the disk spray unit consists of a motor coupled to a centered shaft connected to a spray disk having rectangular outlets, wherein the high-speed motor and the shaft transmission are cooled with compressed air.

In another preferred embodiment, the nozzle spray unit is a nozzle coupled to a network of pipes and containing a nozzle having a venturi effect and reduction of diameter from the pipe to a 0.5 mm to a 3 mm nozzle and containing a pressure valve which may be located on any stretch of the pipe, proximate to or distant from the nozzle.

In an additional preferred embodiment, the nozzle spray unit is a nozzle for viscous non-Newtonian fluids thixotropic and rheopectic fluids.

In a preferred embodiment, the temperature spray unit consists of a nozzle in an extremity of a pipe connected to a collector or pressurized supply tank having an internal stirrer and having a pressure gauge and a compressed air inlet, wherein the temperature spray unit is at a temperature exceeding the melting point of the material entering the spray system and the required temperature of the system is maintained by means of a system of heating selected from electrical resistors, thermal oil, steam jackets, heat insulants, or a combination thereof.

In a preferred embodiment, one of the collector types of the tower is a collector of particulate material having a double jacket to maintain a final temperature of the product and prevent rehydration arising from the conditions of humidity external to said collector, and located solely at an outlet from a cyclone, or two thereof are coupled into a conical section of the tower and into the outlet from the cyclone. In a further preferred embodiment, two of the collector types of said plurality of collector types comprise a collector mesh having a mesh size of between 50 and 400.

In another preferred embodiment, one of the collector types of the tower comprises: a lower body of support and discharge of finished product; an intermediate mesh, interchangeable according to a type of system to be connected and particle size to be operated, and an upper body having a tangential air inlet increasing pressure and permitting fluidization of particles; wherein said collector allows to vary a dwell time of particles in an interior thereof, permitting achieving predetermined conditions of humidity, increasing particle size by means of spraying an agglutinant and increasing particle sphericity in case of cold microencapsulation. In a further preferred embodiment, said collector type comprises a chamber having two compartments, a first compartment having tangential air inlet and possessing a conical accessory to modify a flow of air and a manner in which a second compartment is dispersed.

In a preferred embodiment, one of the collector types of the tower comprises a conical support having an angle of inclination of 60° permitting changing a manner in which air ascends developing an enveloping and toroidal flow permitting agglomeration of particles, increasing the size thereof, and wherein the conical support possesses air inlet points to take advantage of the angle of inclination.

In another preferred embodiment, one of the collector types comprises: a lower body of support and discharge of finished product; an intermediate mesh, interchangeable according to a type of system to be connected and particle size to be operated, and an upper body having a tangential air inlet increasing pressure and permitting fluidization of particles; wherein said collector allows to vary a dwell time of particles in an interior thereof, permitting achieving predetermined conditions of humidity, increasing particle size by means of spraying an agglutinant and increasing particle sphericity in case of cold microencapsulation; and wherein it additionally incorporates a conical support having an angle of inclination of 45° and a variable height nozzle type spray system permitting an injection of an agglutinant and a change in particle size of exposed particles.

BRIEF DESCRIPTION OF THE DRAWINGS

FIG. 1 shows a diagram of the system of the present invention wherein there is shown the tower (1) with the head A and the collector B.

FIG. 2 illustrates a type of disk spray head for installation in the system of the present invention in part A of FIG. 1.

FIG. 3 illustrates a type of nozzle spray head for installation in the system of the present invention in part A of FIG. 1.

FIG. 4 illustrates a type of dual fluid spray head for installation in the system of the present invention in part A of FIG. 1.

FIG. 5 illustrates a type of high-temperature spray head for installation in the system of the present invention in part A of FIG. 1.

FIG. 6 illustrates a type of simple collector (type 1) for installation in the system of the present invention in part B of FIG. 1.

FIG. 7 illustrates a type of simple collector (type 2) for installation in the system of the present invention in part B of FIG. 1.

FIG. 8 illustrates a type of simple collector (type 3) for installation in the system of the present invention in part B of FIG. 1.

FIG. 9 illustrates a type of simple collector (type 4) for installation in the system of the present invention in part B of FIG. 1.

FIG. 10 shows a diagram of the system of the present invention wherein there is shown the tower (1) with the head A and the collector B.

FIG. 10.1. shows individually the main chamber, to which the heads and collectors are attached.

FIG. 11 illustrates a type of disk spray head (A1) for installation in the system of the present invention in part A of FIG. 10.

FIG. 12 illustrates a type of nozzle spray head (A2) for installation in the system of the present invention in part A of FIG. 10.

DETAILED DESCRIPTION OF THE INVENTION

Figure 1:
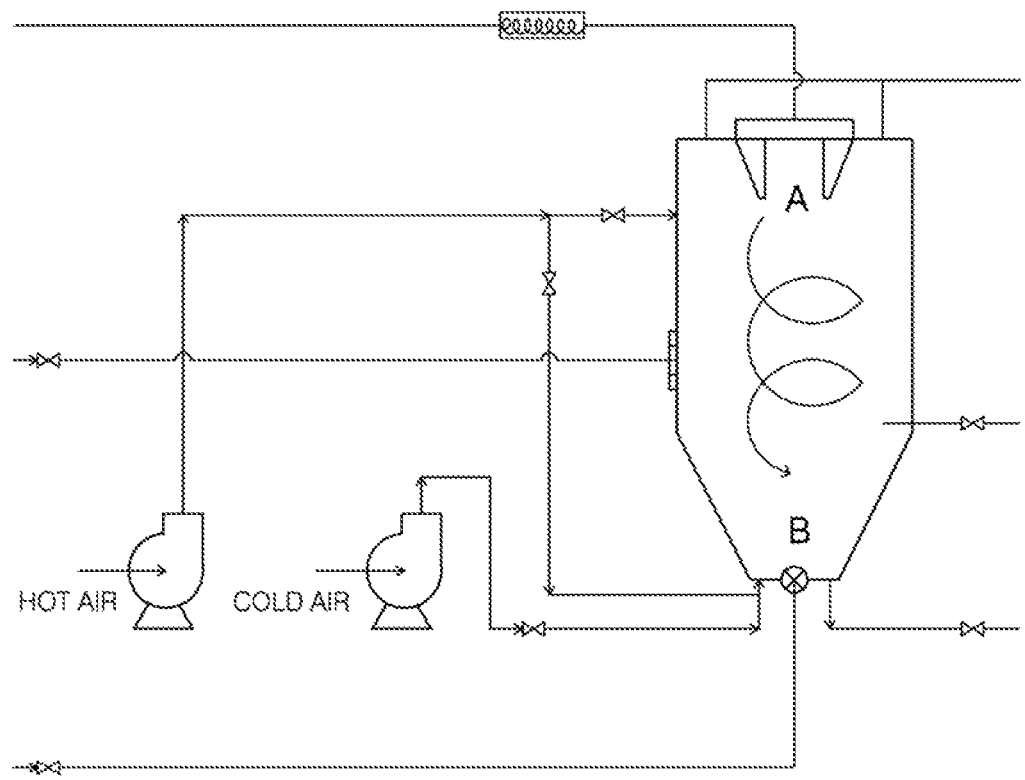
Figure 2:
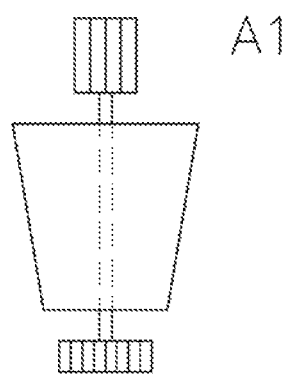
Figure 3:
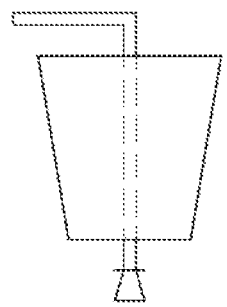
Figure 4:
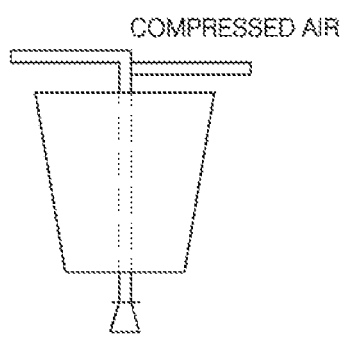
Figure 5:
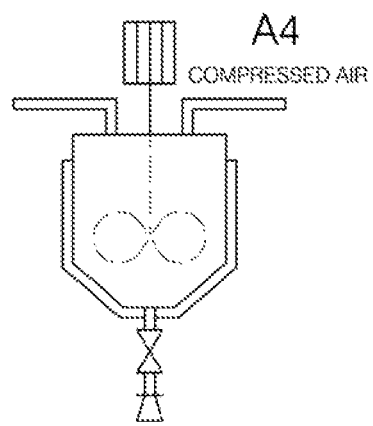
Figure 6:
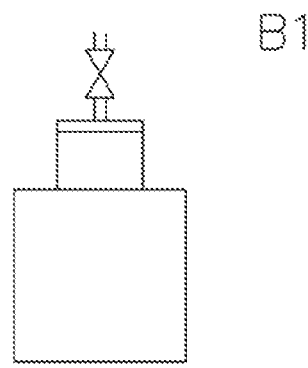
Figure 7:
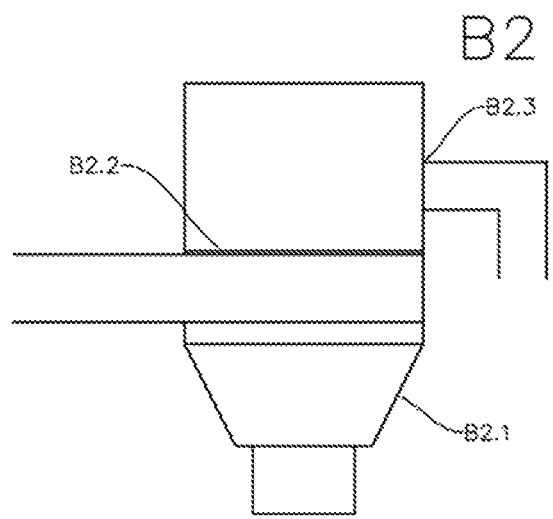
Figure 8:
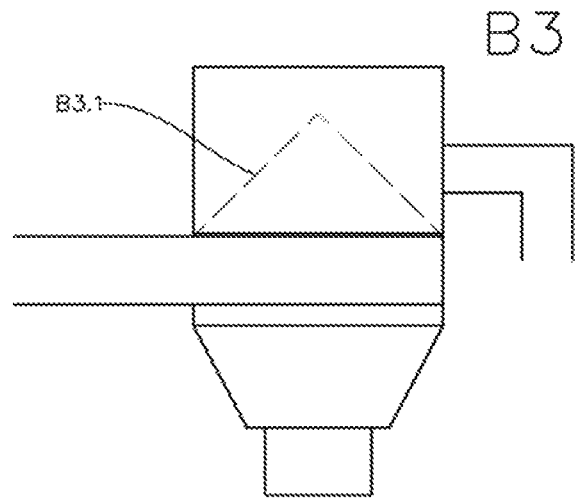
Figure 9:
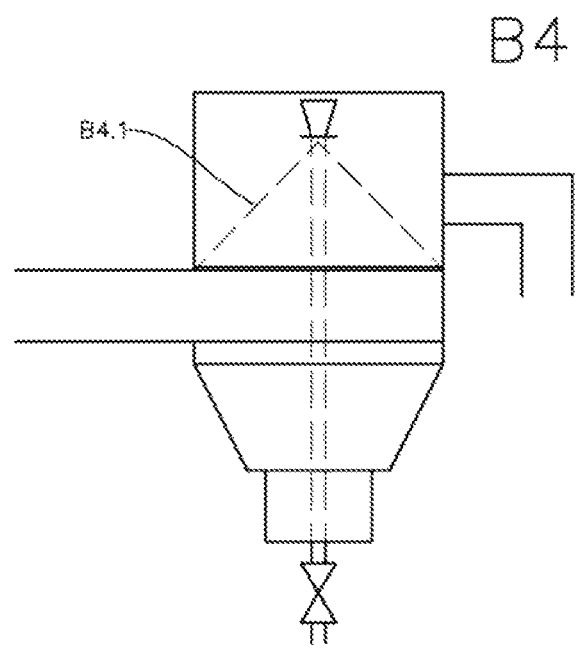
Figure 10:
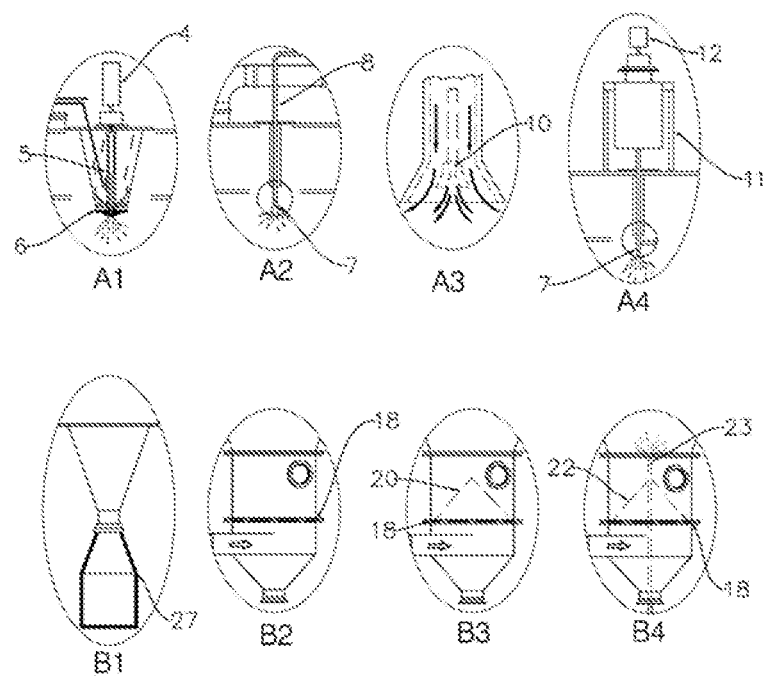
Figure 10:
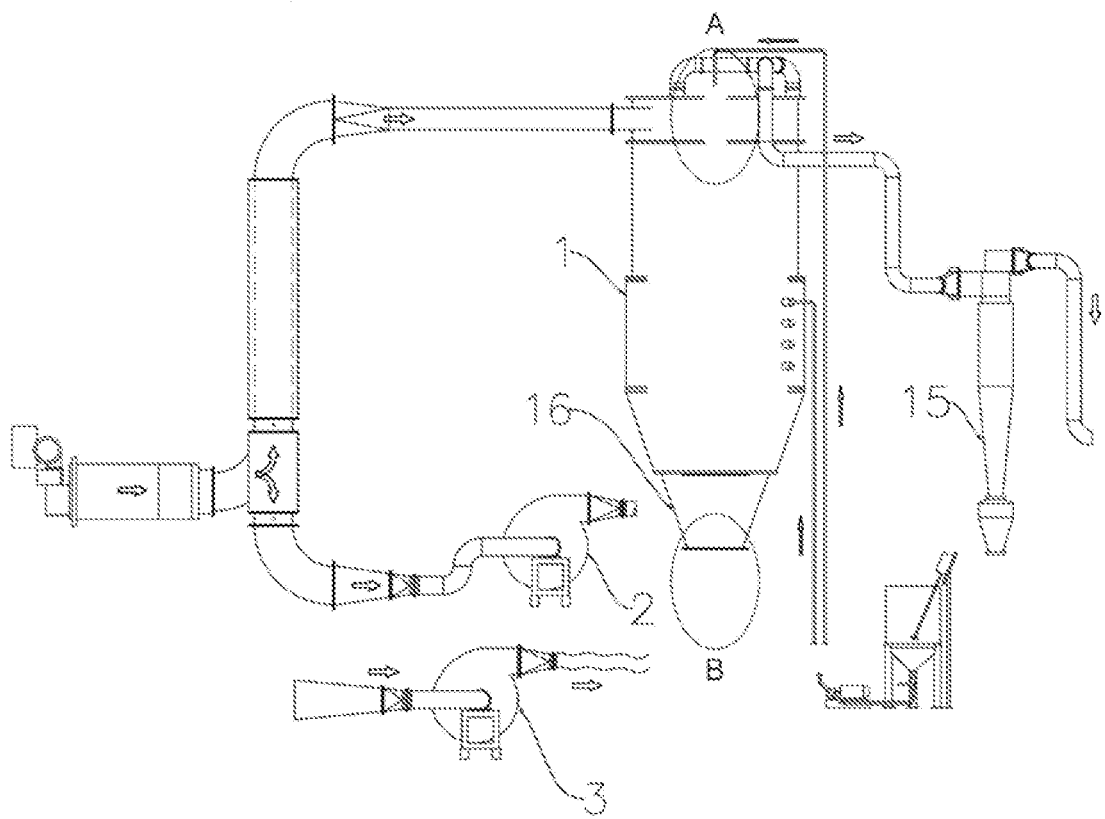
Figure 11:
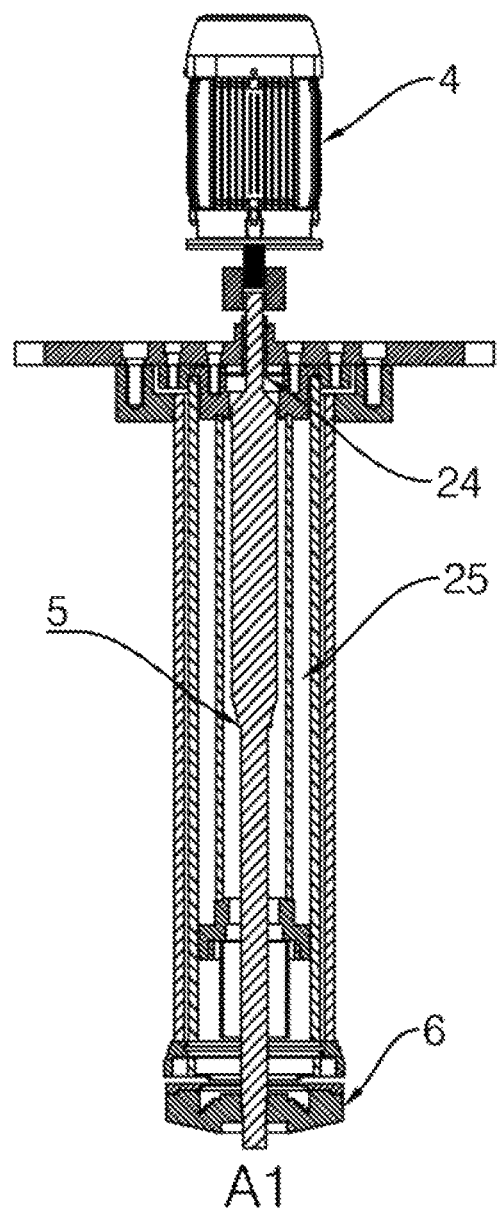
Figure 12:
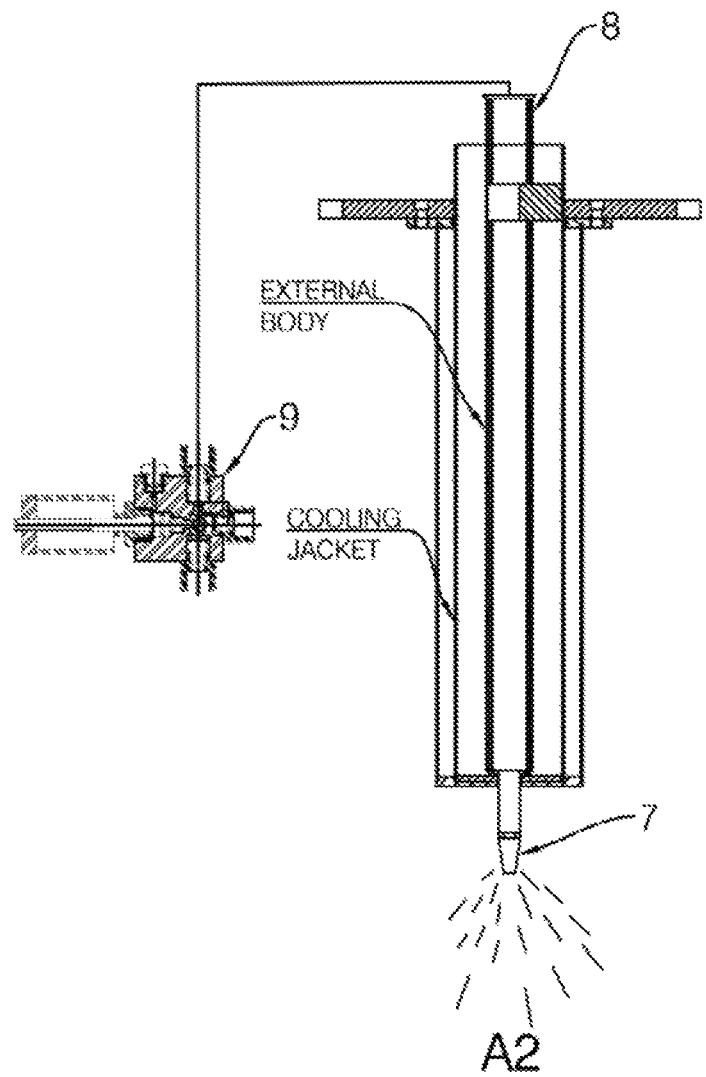
Figure 13:
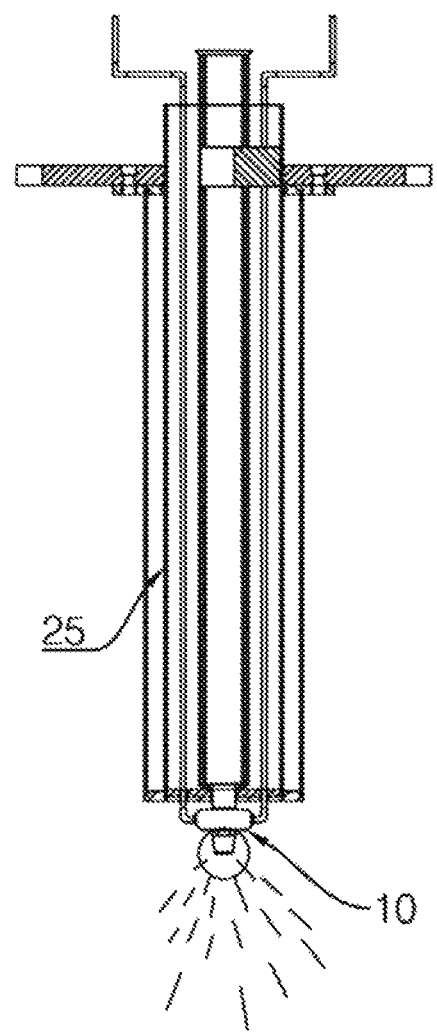
FIG. 13 illustrates a type of dual fluid spray head (A3) for installation in the system of the present invention in part A of FIG. 10.
Figure 14:
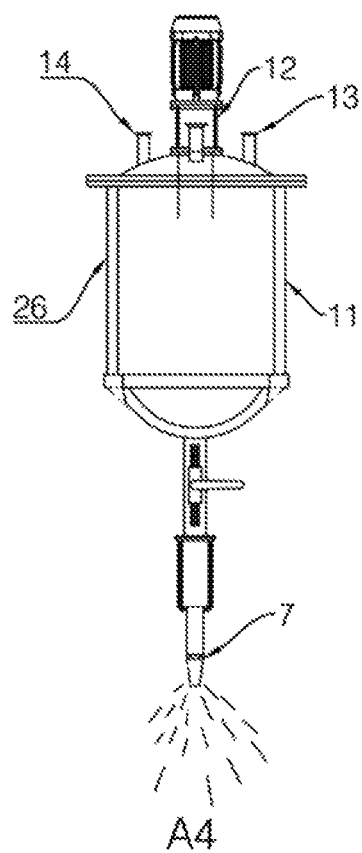
FIG. 14 illustrates a type of high-temperature spray head (A4) for installation in the system of the present invention in part A of FIG. 10.
Figure 15:
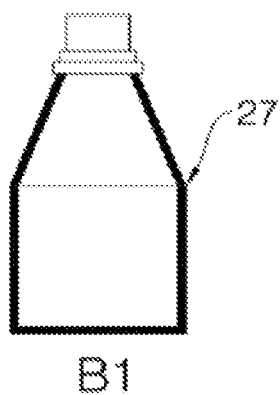
FIG. 15 illustrates a type of jacketed simple collector (B1) for installation in the system of the present invention in part B of FIG. 10.
Figure 16:
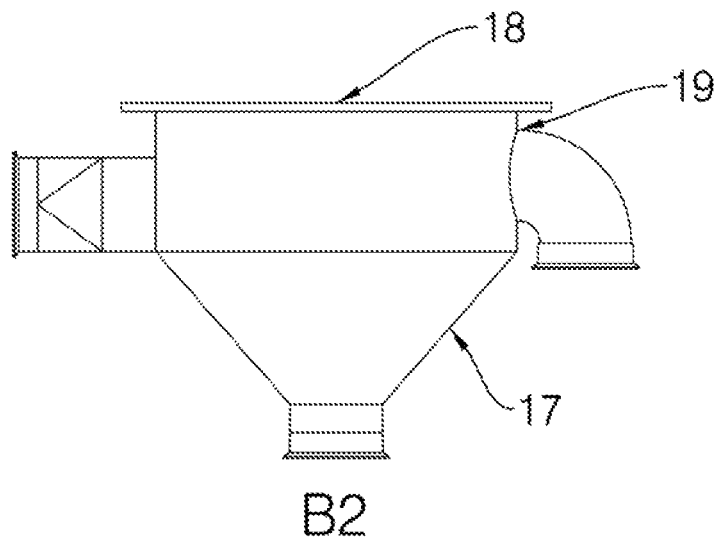
FIG. 16 illustrates a type of simple collector (B2) with tangential inlet for installation in the system of the present invention in part B of FIG. 10.
Figure 17:
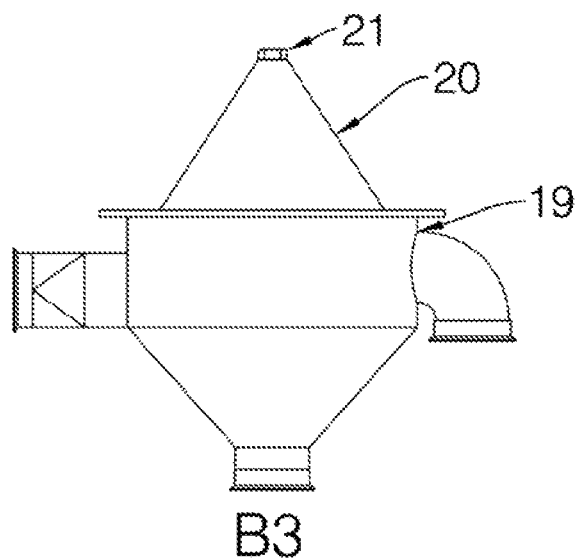
FIG. 17 illustrates a type of simple collector (B3) with tangential inlet and dispersing cone for installation in the system of the present invention in part B of FIG. 10.
Figure 18:
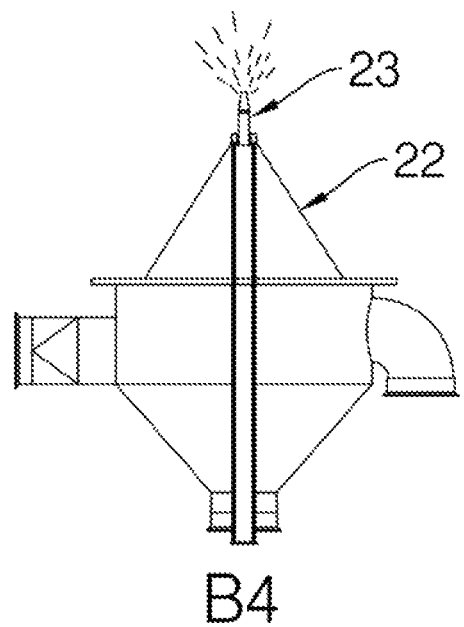
FIG. 18 illustrates a type of simple collector (B4) with tangential inlet and spray nozzle for installation in the system of the present invention in part B of FIG. 10.

The present invention provides a tower of multiple types of modular systems, for the generation of powders.

That is, it is a tower comprising an upper unit and a lower unit, both units are arranged to allow air flow within the tower from the upper unit to the lower unit; or in the other way.

This multiple system for the formation of powder particles consists of a superior modular system that interchanges the spray heads at the top that allow the entry of hot air, compressed air and liquid currents to be dried and at the bottom there is a unit that allows the different types of collectors to be exchanged to obtain the dry material, agglomerated powder, or the final microencapsulated product. The design of the device of the present invention allows maintaining the thermodynamic considerations for each specific process, together with the conditions of heat and mass transfer.

The upper part of the system comprises various interchangeable components, which may be a disc spray unit, a nozzle spray unit, a dual fluid spray unit, or a high temperature spray unit. The upper unit is adapted to work with one of the four types of interchangeable heads. So the first head could work with at least one of several different types of collectors.

The upper unit has been adapted to be modified by replacing the first interchangeable head with a different type of head than the first.

The first head selected from the head group consists of a disk spray unit, which could be replaced by the other type of heads described before, this type of interchangeable head could work with at least one of the several collector types In this way, each type of head could work with any type of collector In one embodiment, the invention covers a multiple modular device or system useful for the obtainment of products in powder form having desired characteristics of particle size and configuration.

In another embodiment, the invention covers the use of the multiple modular device or system for the food industry, principally for the manufacture of foodstuffs in granular and/or powder form for human beings and animals, wherein the products in powder form present desired characteristics of particle size and configuration.

In another embodiment, the invention covers the use of the multiple modular device or system for the agrochemical industry, for the obtainment of minerals and fertilizers in granular and/or powder form, together with nutritional and foliar application additives.

In an additional embodiment, the invention covers the use of the multiple modular device or system for the industry related with cosmetic products.

In an additional embodiment, the invention covers the use of the multiple modular device or system for the pharmaceutical industry, principally with the preparation of solid pharmaceutical compositions wherein the products present desired characteristics of particle size and configuration.

In a further additional embodiment, the invention covers the use of the multiple modular device or system for the development of controlled release products in all the fields of application, including from a matrix of active compounds to compositions having a differentiated nucleus, it moreover being a complement to other techniques of encapsulation, wherein the products present desired characteristics of particle size and configuration.

The multiple system for the formation of particles in powder form according to the present invention is characterized by being a modular system interchanging spray heads (A) in the upper part of the apparatus for the inlet of hot air, compressed air and liquid currents, utilizing the same equipment according to the operating conditions required and, in the base of said equipment, additionally changing the collector (B) for the obtainment of the material in powder or agglomerated powder form, or of the final microencapsulated product. The design of the device of the present invention permits that the thermodynamic considerations for each specific process, together with the conditions of heat and mass transfer, be maintained.

In FIGS. 1 and 10 there is shown the complete configuration of the system wherein there are illustrated the hot and cold air fans required to create the conditions in the principal tower (1).

Four heads exist for the upper part of the system, as illustrated in FIGS. 2 to 5 and 11 to 14, these being interchangeable, one being a disk spray unit A1 (FIGS. 2 and 11); another being a nozzle spray unit A2 (FIGS. 3 and 12); another being a dual fluid spray unit A3 (FIGS. 4 and 13) and another being a high temperature spray unit A4 (FIGS. 5 and 14).

FIG. 10.1. shows individually the main chamber, to which the heads and collectors are attached, with an expandable intermediate section 28 that allows the effective drying volume to be expanded, so that the residence time within the chamber can be controlled, either for drying or cooling.

On the roof of the chamber 29 there is an air diffuser designed to guarantee the correct distribution of the necessary air flows for each of the processes.

In the upper part, there are two ducts 30 installed perpendicularly, arranged at 180° to achieve uniformity in the extraction of cold exhaust air in the high temperature atomization process.

The chamber has multiple connections arranged along the lower cylindrical section that allows the atomization nozzles to be positioned at the appropriate height according to the turbulence reached by the fluidized bed.

In the lower part of the tower 1, the diameter of the cylindrical section 32 is enlarged by means of expandable seals 33 in order to guarantee that the particles do not easily adhere to the chamber surfaces and turbulent flow can be generated. free towards the air outlet in the case of the spray dryer or a free laminar flow in the case of spray cooling.

The chamber has a hole in the lower cone 34 of the chamber that can be used as a viewer 35 when the system works with a single product outlet for the cyclone and can be used as an air outlet duct when the process works with both B1 collecting systems in the lower discharge of the chamber and the cyclone simultaneously.

Figure 19:
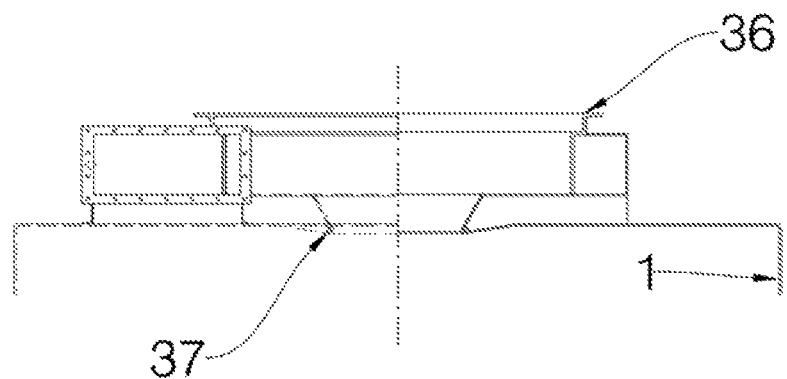
FIG. 19 shows a schematic view of the upper air diffuser where heads coupled.

As shown in FIG. 19, the invention also has a system 36 with a "Z"-shaped design that allows the assembly at its upper part of the diffuser housing and the different atomization heads by means of welded plates, so that the interchangeability of heads allow to keep the calculated air speed at the entrance of chamber 1 of 1135 scfm.

This diffuser has a cooling system 37 around the lower neck of the diffuser that prevents overheating of the limit surface where the hot air enters the drying chamber, to prevent the dried product from burning when it comes out of any of the spray heads.

The disk spray unit system A1, according to FIGS. 2 and 11, consists of a structure, for example made of AISI 304 stainless steel, having a high speed, for example 25000 rpm, motor 4 directly coupled to a centered shaft 5 connected, by means of a quick connector, to a spray disk 6 having rectangular outlets and straight radial bore, wherein the high speed motor and the transmission of the shaft are cooled by means of a new system with compressed air that avoids the external lubrication of the bearings, maintaining stable the expansion of the bearings. Additionally, in the lower part of the system, there is provided a distributor having eccentric disks that allows to uniformly distribute the pumped product and a graphite bushing pressed by a spring that allows to center the shaft.

For its part, the nozzle unit system A2, as shown in FIGS. 3 and 12, is a conventional nozzle 7, for high pressure use, coupled to a network of pipes 8 and to a triple walled structure, for example made of AISI 304 stainless steel, that ensures the isolation of the cold air or hot air inlet pipes, depending on the spraying process. The system additionally contains a nozzle having a venturi effect and with reduction of diameter of the pipe to a 0.5 mm to 3 mm nozzle. Furthermore, it contains a special pressure valve 9 which may be located on any stretch of the pipe and proximate to or distant from the nozzle. This valve 9 allows to return the excess fluid back to the product feeding tank.

The dual fluid nozzle system A3, as shown in FIGS. 4 and 13, is a conventional nozzle 10 for viscous non-Newtonian fluids (thixotropic and rheopectic liquids) and low working pressures. It also contains a triple walled structure 25, for example made of AISI 304 stainless steel, that thermally isolates the cold air or hot air flow nozzle The configuration of the pipes that allow the entry of the liquid product and the compressed air is through the middle jacket of the ducts of the nozzle unit structure.

The high-temperature spray system or unit A4 (FIGS. 5 and 14) consists of a conventional nozzle 7, for low pressures, in the end of a pipe connected to a collector or tank 11 having a pressurized supply and having an internal stirrer 12 and having a pressure gauge 13 and a compressed air inlet 14. The latter has a resistor system that allows to heat the air prior to enter the tank, in such a way that the temperature of the product to be sprayed is not lowered. The pressurized tank additionally has an external jacket with a depressurizing system that allows its thermal insulation. The complete system will be at a temperature exceeding the melting point of the material entering the spray system. The required temperature of the system may be maintained by means of any conventional system of heating 26, for example by means of electrical resistances, thermal oil, steam jackets, or rendering the entire system adiabatic, that is to say with appropriate heat insulants, or any combination of the same.

With reference to the collectors located in part B of FIGS. 1 and 10, they are also interchangeable. The interchangeable collectors may be of conical type having valves and collectors. Others are of chamber type having two compartments having a tangential air inlet separated by an interchangeable collector mesh for the purposes of movement of the particles. The collector mesh may be flat and between 50 and 400 for a particle size of between 295 microns and 37 microns, respectively. In one embodiment, said mesh may be conical, as shown in the type 3 collector (B3 and B4).

A first type of collector B1, as shown in FIGS. 6 and 15, is a collector of particulate material having a double jacket 27 to maintain the final temperature of the product and to prevent rehydration arising from the conditions of humidity external to the equipment; according to the disposition of the outlet air connections it is located solely at the outlet from the cyclone 15 (FIG. 10) or, in defect thereof, two thereof are coupled, one in the conical section of the tower 16 (FIG. 10) and the other in the outlet from the cyclone.

A second type of collector B2, as shown in FIGS. 7 and 16, comprises three parts, a lower body of support and finished product discharge 17, an intermediate mesh 18, interchangeable according to the type of system to be connected and the particle size to be operated, and an upper body 19 having a finished product outlet and having a tangential air inlet to increase the pressure and permit the fluidization of particles; this device permits varying the dwell time of the particles within the interior thereof, permitting achieving the desired conditions of humidity, increasing particle size by means of the spraying of agglutinant and increasing sphericity in the case of cold microencapsulated particles.

A third type of collector B3, as shown in FIGS. 8 and 17, incorporates into the collector B2 a conical support (B3.1 and 20) having an angle of inclination of 60° permitting to change the manner in which the air ascends, developing an enveloping and toroidal flow permitting the agglomeration of particles, increasing the size thereof; the reduction in the area of the mesh does not reduce the effective working area by virtue of the fact that the conical surface possesses air inlet points to take advantage of the inclined area.

Additionally, B3 presents a chamber having two compartments, one thereof having a tangential air inlet and possessing a conical accessory or support (B3.1 and 20) modifying the flow of the air and the manner in which the latter is dispersed.

A fourth type of collector B4, as shown in FIGS. 9 and 18, incorporates into the collector B2 a conical support (B4.1 and 22) having an angle of inclination of 45° and a variable height nozzle type spray system 23, which is inserted into the cone top fitting 21 permitting the injection of agglutinant and changing the particle size of the particles exposed.

In the present invention, this collector may be advantageously employed both for processes involving low temperature spraying (spray cooling) and those processes including a fluidized bed for drying and agglomeration, wherein the conditions of temperature of the air entering the system are changed.

Advantageously, the system of the present invention allows to operate, with the first interchangeable head installed, with at least one collector of a plurality of collector types, and any head may be used with any collector type or combination thereof. Analogously, any collector type, or combination thereof, may be used with any interchangeable head. The equipment or system of the present invention is very versatile by virtue of the fact that it permits being adapted to configurations of one or two simultaneous collectors, depending on the necessities of the process required, for example for the obtainment of particulate material having two different types of percentage humidity and for when a particulate product is required to be obtained having different particle size characteristics. The equipment of the invention presents the technical advantage of being capable of varying the dwell times of the particles by means of the modifications and/or adaptations made to the configuration of the collectors. In this sense, for the embodiment of a device of the invention having a single collector and high dwell times, a more homogeneous particulate product will be advantageously obtained, and for devices of the invention having two collectors, two homogeneous products, differing from one another however, will be obtained.

EXAMPLES

Example 1: Microencapsulation of Organic Acids by Spray Cooling

In animal feeding the effect is known that organic acids have on pathogenic bacteria in the animals on reducing the pH of the intestinal medium and propitiating cellular lysis; nevertheless the presence of these acids in the stomach wherein there exist very high conditions of humidity makes them disassociate and they do not reach the host site of the microorganisms in an appropriate condition. The solution is to protect the acids from the gastric medium by means of the encapsulation thereof in a partially soluble matrix, for example with a lipid matrix comprising mixtures of hydrogenated vegetable oils such as soya, palm, maize, sunflower and mixtures thereof having defined characteristics rendering them solid at ambient temperature.

For this purpose, the configuration of the equipment utilizes the system with cold air, the spray head A4 and the collector B2.

A suggested mixture, which is however not limiting, may include citric, malic, fumaric, phosphoric acids and the salts thereof and other compounds of zootechnic interest, and the fatty matrix having derivatives of stearic acid, palm stearate, glycerin, natural waxes and mixtures thereof.

A mixture such as that described composed of:
13% Citric Acid
19.22% Fumaric Acid
8.5% Malic Acid
1.4% Ascorbic Acid
5.7% Phosphoric Acid
52.2% Fatty Matrix
wherein the fatty matrix was heated and melted between 55° C. and 77° C. and mixed with the organic acids until complete homogeneity thereof.

The suspension was then sprayed by means of the sprayer A4 maintaining constant temperature throughout the system. Said suspension was sprayed into the chamber onto counter current air at a temperature of 12° C.

As a result, in the lower part there were obtained spherical particles having crystals of acids in the interior thereof, suspended in the bed developed in the collector B2 in order that the friction between the particles eliminated any irregularity.

They were subsequently discharged at the outlet of collector B2, there being found particles having sizes of between 800 and 1200 microns, perfectly formed. They were subjected to a solubility test in cold water and acid medium at pH 3.5, yielding 95% retention of the acids; subsequently they were submitted to a process of heating in the presence of lipase enzymes, release of 90% being obtained in the first 24 minutes of exposure.

Practically, compositions such as these may accommodate other compounds of interest capable of being dispersed, such as antibiotics, vaccinations, anti-inflammatories, etc., the objective whereof being the release thereof in the intestine.

Example 2: Drying of Copper Monolysinate by Fluidized Bed

Organometallic complexes are utilized as bioavailable sources of minerals, both for human beings and for animals. These complexes are generally combinations of amino acids, such as lysine, glycine, methionine, etc., with metals, such as iron, zinc, manganese, copper, etc., and are referred to by name as chelates or complexes according to the nature of the chemical bond formed.

For the use thereof in premixtures it is necessary to have a presentation in fine powder or granular form to prevent interactions with the other components of the mixture.

Having the objective of improving the stability thereof the humidity content is required to be reduced to between 2 and 10%; for this purpose, the configuration is employed of head A2 and the collector B3, utilizing hot air.

For the synthesis of copper lysinate one has the following arrangement:
44% Water
44% Copper sulfate
12% Lysine.

The water was heated to 80° C., the lysine was added and then the temperature was reduced to 65° C. and the copper sulfate was added until total dissolution.

The mixture was held at the temperature of 65° C., maintaining the reaction temperature for 40 minutes.

The solution was then sprayed onto the fluidized bed system having the following process conditions:
Inlet flow 125 m³/h
Operating temperature 65° C.
Spray pressure 30 PSI
Spray rate 45 g/minute
Nozzle diameter 1.4 mm
Inlet air temperature 160° C.
Outlet air temperature 71° C.

The agglomerated product presented an acceptable performance, a particle size of between 800 and 1100 microns being obtained; the humidity content was analyzed, reporting 7%, and it presented thermal stability in the mixing tests.

Example 3: Obtainment of an Encapsulated Soluble Flavoring

The technique of drying by spray dryer is well known consequent upon the efficiency thereof for the generation of solid particles having a minimum impact upon the nature of the substances to be dried. The production of aromatic compounds by means of this technique implies the development of suitable drying vehicles to prevent the losses of volatile constituents.

Having the objective of improving stability thereof, the humidity content must be reduced to between 2 and 10% and the particle size must be as small as possible to ensure the greatest area of contact; for this purpose the configuration of head A1 and the collector B1 is employed, utilizing hot air.

Apple Flavor in Powder Form
  33% Liquid artificial apple flavor
  20% Maltodextrin
  2% Gum Arabic
  1% Yucca starch
  5% Protein isolated from soya
  39% Water.

The water was heated to 40° C. and the ingredients in powder form were added 1 by 1 until total dissolution was achieved, then the artificial flavor was added, and the mixture was subjected to homogenization at 2500 PSI over 10 minutes.

Once this emulsion had been prepared, spraying was carried out utilizing the spray disk of the head A1, under the following conditions:
  Inlet temperature 190° C.
  Outlet temperature 90° C.
  Disk rotational frequency 310 Hz
  Inlet flow 37 liters/h.

A free-flowing powder was obtained with the microencapsulated flavoring having a particle size of between 200 and 400 microns and a percentage humidity of 3%, being stable to handling and readily dispersible in cold water. A test of active compound encapsulation was carried out, yielding 92% protection.

Example 4: Granulation of Calcium Propionate

Calcium propionate is utilized as a preservative in many products, such as bakery, processed meat and lactic products; in the processing plants it is utilized sprayed onto surfaces having the objective of controlling molds; nevertheless the high degree of dustiness thereof becomes a limitation by virtue of the capacity thereof to irritate the respiratory tracts.

One option for this is to develop a granulated powder form to prevent particles having sizes smaller than 200 microns, for this purpose the equipment with the head A3 and the collector B4 was utilized, having the objective of maximizing the agglomeration.

Agglomeration of Calcium Propionate

A solution of calcium propionate in water was prepared by means of the reaction between propionic acid and sodium hydroxide in a molar ratio of 1:1.

The following parameters were utilized for the drying employing the configuration planned:

Inlet temperature 250° C.
Outlet temperature 130° C.
Supply pressure 250 PSI
Spraying rate 35 liters/h
Collector B4 rate 5 liters/h.

A granular product was obtained having a particle size of between 1000 and 1300 microns and a humidity content of 4%, the process of drying and agglomeration being effective.

The examples presented allow the practicality to be deduced of the system and of the possibilities of diverse products which may be operated, whether to obtain a product as a fine powder or agglomerate or to form diverse types of capsules and microcapsules, simply through the interchange of the head or the collectors, maintaining constant the remainder of the layout of the equipment.

The invention claimed is:

1. A tower of a multiple modular system type, for the formation of powders, comprising:

a tower comprising an upper portion and a lower portion, the upper portion and lower portion being arranged to permit a flow of air within the tower from the upper portion into the lower portion;

an upper portion component disposed in the upper portion, the upper portion component comprising a first interchangeable head selected from the group consisting of a disk spray unit, a nozzle spray unit, a dual fluid spray unit and a temperature spray unit, the upper portion adapted to operate, with the first interchangeable head installed, with at least one collector of a plurality of collector types, the upper portion further adapted to be modified by replacement of the first interchangeable head with a second interchangeable head of a different type from the first interchangeable head, the second interchangeable head selected from the group consisting of a disk spray unit, a nozzle spray unit, a dual fluid spray unit and a temperature spray unit, wherein the upper portion being further adapted to operate, with the second interchangeable head installed, with any at least one collector of said plurality of collector types; and a lower portion component disposed in the lower portion, the lower portion component comprising a first interchangeable collector selected from said plurality of collector types, wherein the lower portion being adapted to operate, with the first selected interchangeable collector is adapted to operate installed, with any at least one of a disk spray unit, a nozzle spray unit, a dual fluid spray unit, and a temperature spray unit, the lower portion adapted to be modified by replacement of the first interchangeable collector with a second interchangeable collector of a different type from the first interchangeable collector, the second interchangeable collector selected from said plurality of collector types, the lower portion being further adapted to operate, with the second interchangeable collector installed, with at least one of a disk spray unit, a nozzle spray unit, a dual fluid spray unit, and a temperature spray unit;

wherein said upper portion component includes a piece having a "z"-shaped profile, and said first interchangeable head and said second interchangeable head include corresponding plates that fit into said piece having a "z"-shaped profile, allowing the assembly at the upper part of said upper portion component of a diffuser housing and of said first and second interchangeable heads by means of welded plates;

and wherein said lower portion component has a lower cone to which said first interchangeable collector or said second interchangeable collector may be coupled.

2. The tower according to claim 1, wherein the disk spray unit consists of a motor coupled to a centered shaft connected to a spray disk having rectangular outlets, wherein the high-speed motor and the shaft transmission are cooled with compressed air.

3. The tower according to claim 1, wherein the nozzle spray unit is a nozzle coupled to a network of pipes and containing a nozzle having a venturi effect and reduction of diameter from the pipe to a 0.5 mm to a 3 mm nozzle and containing a pressure valve which may be located on any stretch of the pipe, proximate to or distant from the nozzle.

4. The tower according to claim 1, wherein the nozzle spray unit is a nozzle for viscous non-Newtonian fluids, thixotropic and rheopectic fluids.

5. The tower according to claim 1, wherein the temperature spray unit consists of a nozzle in an extremity of a pipe connected to a collector or pressurized supply tank having an internal stirrer and having a pressure gauge and a compressed air inlet, wherein the temperature spray unit is at a temperature exceeding the melting point of the material entering the spray system and the required temperature of the system is maintained by means of a system of heating selected from electrical resistors, thermal oil, steam jackets, heat insulants, or a combination thereof.

6. The tower according to claim 1, wherein one of the collector types of the tower is a collector of particulate material having a double jacket to maintain a final temperature of the product and prevent rehydration arising from the conditions of humidity external to said collector, and located solely at an outlet from a cyclone, or two thereof are coupled into a conical section of the tower and into the outlet from the cyclone.

7. The tower according to claim 6, wherein two of the collector types of said plurality of collector types comprise a collector mesh having a mesh size of between 50 and 400.

8. The tower according to claim 1, wherein one of the collector types of the tower comprises:

a lower body of support and discharge of finished product;

an intermediate mesh, interchangeable according to a type of system to be connected and particle size to be operated, and an upper body having a tangential air inlet increasing pressure and permitting fluidization of particles, wherein said collector allows to vary a dwell time of particles in an interior thereof, permitting achieving predetermined conditions of humidity, increasing particle size by means of spraying an agglutinant and increasing particle sphericity in case of cold microencapsulation.

9. The tower according to claim 8, wherein the collector type comprises a chamber having two compartments, a first compartment having tangential air inlet and possessing a conical accessory to modify a flow of air and a manner in which a second compartment is dispersed.

10. The tower according to claim 1, wherein one of the collector types of the tower comprises a conical support having an angle of inclination of 60° permitting changing a manner in which air ascends developing an enveloping and toroidal flow permitting agglomeration of particles, increasing the size thereof, and wherein the conical support possesses air inlet points to take advantage of the angle of inclination.

11. The tower according to claim 1, wherein one of the collector types comprises:

a lower body of support and discharge of finished product;

an intermediate mesh, interchangeable according to a type of system to be connected and particle size to be operated, and an upper body having a tangential air inlet increasing pressure and permitting fluidization of particles, wherein said collector allows to vary a dwell time of particles in an interior thereof, permitting achieving predetermined conditions of humidity, increasing particle size by means of spraying an agglutinant and increasing particle sphericity in case of cold microencapsulation;

and wherein it additionally incorporates a conical support having an angle of inclination of 45° and a variable height nozzle type spray system permitting an injection of an agglutinant and a change in particle size of exposed particles.

12. The tower according to claim 1, additionally comprising an expandable intermediate section positioned between said upper portion and said lower portion.

* * * * *